(No Model.) 2 Sheets—Sheet 1.
E. P. HAUGEN, Dec'd.
A. L. HIMLE, Administrator.
BAND CUTTER AND FEEDER.
No. 496,260. Patented Apr. 25, 1893.
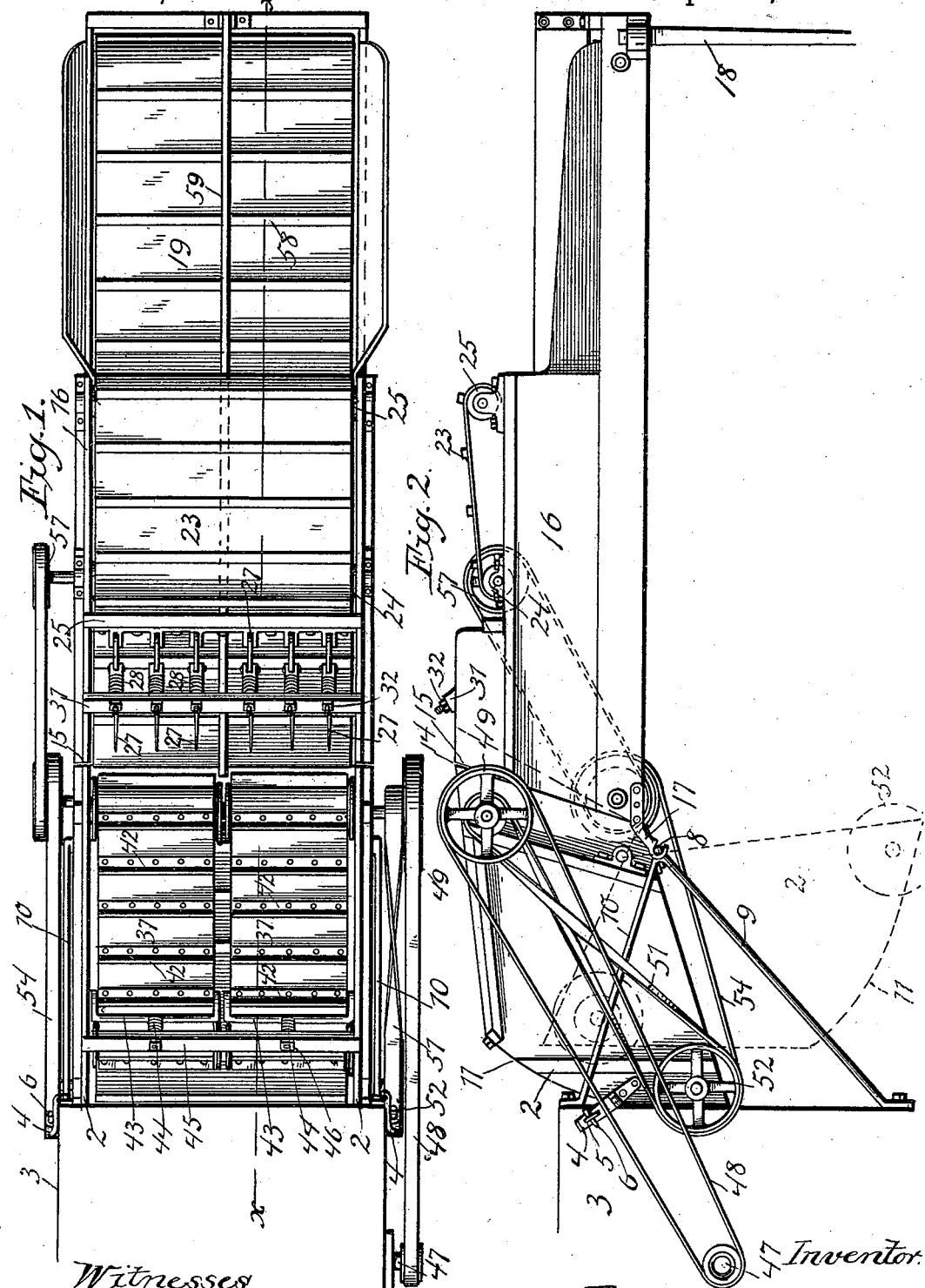
Witnesses
Inventor
Engebret P. Haugen
By Paul & Merwin attys (No Model.) 2 Sheets—Sheet 2.
E. P. HAUGEN, Dec'd.
A. L. HIMLE, Administrator.
BAND CUTTER AND FEEDER.
No. 496,260. Patented Apr. 25, 1893.
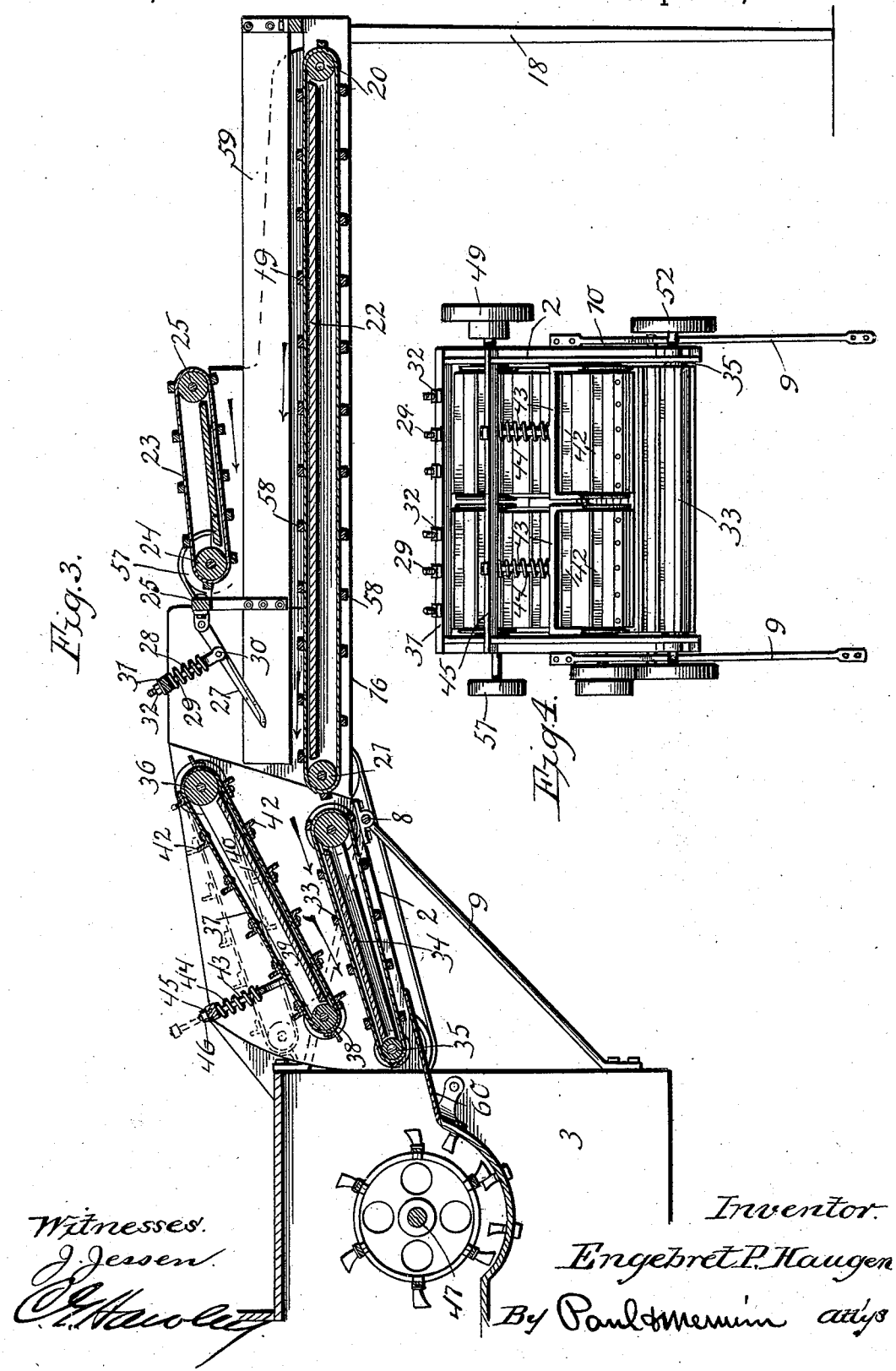
Witnesses:
J. Jessen
Inventor:
Engebret P. Haugen
By Paul & Merwin attys

UNITED STATES PATENT OFFICE.

ENGEBRET P. HAUGEN, OF LAC QUI PARLE, MINNESOTA; ANDREW L. HIMLE ADMINISTRATOR OF SAID HAUGEN, DECEASED.

BAND-CUTTER AND FEEDER.

SPECIFICATION forming part of Letters Patent No. 496,260, dated April 25, 1893.

Application filed February 23, 1892. Serial No. 422,337. (No model.)

*To all whom it may concern:*

Be it known that I, ENGEBRET P. HAUGEN, of Lac Qui Parle, in the county of Lac Qui Parle and State of Minnesota, have invented a certain Improved Band-Cutter and Feeder, of which the following is a specification.

My invention relates to improvements in band cutters and feeders for use in connection with thrashing machines and its object is to provide a device of this class which will be of a more simple and cheap construction than the devices heretofore constructed and which will not clog and choke when in use.

To this end my invention consists in general in the constructions and combinations hereinafter described and particularly pointed out in the claims.

The invention will be more readily understood by reference to the accompanying drawings, forming a part of this specification, in which:—

Figure 1 is a plan view of a machine embodying my invention. Fig. 2 is a side elevation thereof. Fig. 3 is a vertical section on the line $x$—$x$ of Fig. 1, and Fig. 4 is an elevation of the front end of the feeder.

As shown in the drawings, my invention is made up of two parts, namely the band cutter portion and the feeder. The last has the side-bars 2 which are fastened upon the sides 3 of the thrashing machine by the hasps 4 hinged on the sides 2 and fastened upon staples 5 on the thrashing machine by pins 6. The mouth of the feeder is thus held squarely in front of the opening leading into the cylinder of the thrashing machine. The rear end of the feeder is pivotally secured upon the cross-bar 8 which is supported by the brackets or rods 9 and 10 arranged at each side. The upper corners 11 of the feeder-box are rounded off as shown and by unfastening the hasps 4 the feeder may be dropped down to permit easy access to the cylinder of the thrasher. The rear edges 14 of the sides are upwardly and backwardly inclined and the edges 15 of the cutter-box 16 are adapted to engage the same, the cutter-box being held in place by the hooks 17 engaging the rod 8. These hooks are so arranged that when the rear end of the cutter-box 16 is lowered the hooks may be disengaged from the rod, while when the box is raised the hooks are locked thereon by the ends of the hooks protruding backward and under the ends of the rod, and thereby preventing the raising of the forward end of the cutter box until the rear end shall have been lowered, to pass the ends of the hooks from beneath the rod. The rear end of the box 16 is supported by the usual legs 18.

In the bottom of the cutter-box I arrange the endless canvas belt 19 passing over the rolls 20 and 21, the latter of which is driven. The top of the belt passes forward over the bottom board 22 of the box and extends forward to deliver the grain into the feeder. Just above this conveyer or belt 19 I arrange the short conveyer 23 driven over rolls 24 and 25 and having its lower section passing in the same direction with the upper part of the conveyer 19. Forward of the roll 24 I arrange the cross rod 25 and thereon pivot the upper ends of the knives 27. These knives are held down by the coiled springs 28 surrounding stop-rods 29 having their lower ends pivoted at points 30 on the knives. The upper ends of these stop-rods pass through the cross-bar 31 and are provided with nuts 32 by means of which the downward throw of the knives may be regulated.

In the lower part of the feeder-box I provide the endless conveyer belt 33 passing over the floor 34 of the box and driven by the roll 35. In the upper and rear part of the feeder-box I journal the shaft of the roller 36. The two leather belts 37 of equal width pass over this roll and have their lower ends running over the short rollers 38 journaled in the frame 39 between the sides of which are the short boards 40. These leather belts are provided with a series of metal angle bars or flights 42. The upper ends of the side frame pieces are loosely journaled on the shaft of the roller 36 thereby pivoting the two leather conveyer belts thereon. The lower portion of each belt section is supported by a rod 43 branching at its lower end into a fork the ends of which are fastened on the frame 39. A coiled spring 44 is introduced between the fork and the cross-bar 45 and is adapted to hold the belt down under all ordinary circumstances. A stop-nut 46 is provided on each rod 43 to limit the fall of the belt.

The operation of my device is as follows: The upper roller 36 is driven directly from the cylinder shaft 47 by a belt 48 passing therefrom over a large pulley 49 on the roller shaft. From a small pulley on the same shaft a cross belt 51 extends down over the pulley 52 on the shaft of the roller 35 at the lower end of the endless conveyer 33. On the other end of the shaft of the roller 35 a belt 54 extends back to drive the roller 21 of the long conveyer belt in the band cutter-box and from the roller 21 a belt extends to the pulley 57 on the shaft of the roll 24 to drive the short conveyer 23. When the machine is started up all these conveyer belts are therefore operated in the directions shown by the several arrows in Fig. 3. As the bundles of grain are thrown on the top of the conveyer belt 19 they are pushed forward by the wooden slats 58 thereon until they come beneath the inclined conveyer belt 23, the forward end of which is lower than its rear end and the bundle is then compressed between the two conveyer belts and forced firmly through the knives 37 which cut the bands of the bundles. A dividing board 59 extends from the rear ends of the cutter-box to the forward end thereof to straighten the bundles on the conveyer belt and prevent the same getting crossed thereon in which case the bands would not be cut. From the cutter box the grain passes between the conveyers 33 and 37 respectively. The heads of the bundles are caught by the metal flights on the leather belts 37 and as these belts rotate more rapidly than the conveyer 33 the top of the bundle under each belt is drawn off and fed into the cylinder. It will be seen that the rollers 38 and the ends of the leather belts set back over the roller 35 of the conveyer 33. The objects of this construction are to free the butts of the straw and to allow the same to fall down quickly into the cylinder. The wooden slats of the lower belt 33 hold the grain thereon and force the feed of the lower part of the bundle. In case the grain clogs on the conveyer 33 it will be seen that one or both of the upper belts of the feeder will yield upwardly to allow the large bundle to pass through the feeder. All choking in the feeder is thus avoided. The usual feed board 60 extends between the lower end of the conveyer 33 and the cylinder plate.

Having thus described my invention, I claim as new and desire to secure by Letters Patent—

1. The combination with the feeder-box of the endless belt adapted to rotate over the floor of the box and provided with cross slats, the driven roll 36, the independent belts passing over said roll and having their lower ends arranged upon independent rolls 38, 38, the frame for supporting said rolls 38, said frames pivoted at their upper ends, metal flights or bars 42 on said belts, the supporting rods 43 and the cross bar 45, and springs arranged thereon, said belts being driven at a greater speed than the conveyer, substantially as described.

2. The combination with the thrashing machine and the cylinder thereof, of a feed-board, the endless belt 33, the independently movable leather-belts 37 arranged above the conveyer 33 and inclined with respect to the same, the lower ends thereof adapted to yield upwardly and the forward end of the conveyer 33 projecting beyond the ends of said belts, substantially as described.

3. The combination, in a band cutter and feeder, of the feeder box, with the thrashing machine, brackets composed of rods 9 and 10 projecting from the end of the thrasher, the cross rod 8 whereon the outer end of the feeder box is pivoted, means for securing the box in its upper position, the cutter box, provided with the hook extensions 17, the lower prongs of said hooks arranged to project beneath the shaft or bar 8 when the cutter box 16 is in its raised position, whereby the same is locked, substantially as described.

In testimony whereof I have hereunto set my hand this 15th day of February, 1892.

ENGEBRET P. HAUGEN.

In presence of—
C. G. HAWLEY,
F. S. LYON.